(12) United States Patent
Friedli et al.

(10) Patent No.: US 7,266,505 B2
(45) Date of Patent: *Sep. 4, 2007

(54) PROCEDURES, SYSTEM AND COMPUTER PROGRAM PRODUCT FOR THE PRESENTATION OF MULTIMEDIA CONTENTS IN ELEVATOR INSTALLATIONS

(75) Inventors: Paul Friedli, Remetschwil (CH); Thomas Meyer, Rotkreuz (CH)

(73) Assignee: Inventio AG, Hergiswil NW (CH)

( * ) Notice: Subject to any disclaimer, the term of this patent is extended or adjusted under 35 U.S.C. 154(b) by 177 days.

This patent is subject to a terminal disclaimer.

(21) Appl. No.: 10/375,617

(22) Filed: Feb. 27, 2003

(65) Prior Publication Data

US 2003/0167284 A1    Sep. 4, 2003

(30) Foreign Application Priority Data

Mar. 1, 2002    (EP) ................................. 02405156

(51) Int. Cl.
*G06Q 99/00*    (2006.01)
(52) U.S. Cl. .................... 705/1; 187/391; 187/392; 187/396; 187/388; 705/14
(58) Field of Classification Search .................... 705/1, 705/15; 187/391–392, 396, 388; 704/231, 704/236, 243
See application file for complete search history.

(56) References Cited

U.S. PATENT DOCUMENTS 5,606,154 A    2/1997   Doigan et al.
5,923,252 A    7/1999   Sizer et al.
6,288,688 B1   9/2001   Hughes et al.
6,341,668 B1*  1/2002   Fayette et al. ............. 187/391
6,349,797 B1   2/2002   Newville et al.
6,615,175 B1*  9/2003   Gazdzinski ................ 704/275
2002/0013144 A1* 1/2002 Waters et al. .............. 455/414

FOREIGN PATENT DOCUMENTS

JP    05319715       12/1993
JP    08108981 A *   4/1996
WO    WO 01/61612    8/2001

OTHER PUBLICATIONS

Proquest article, Business World Special Features: Elevators: Otis line boasts of more value added features; Feb. 28, 2001.*

* cited by examiner

*Primary Examiner*—John G Weiss
*Assistant Examiner*—Traci L. Casler
(74) *Attorney, Agent, or Firm*—Fraser Clemens; Martin & Miller LLC; William J. Clemens

(57) ABSTRACT

A method, a system and a computer program product presents multimedia contents in elevator installations. At least one individual user profile with multimedia contents is stored for each elevator user. When a user is identified, the multimedia contents in the associated user profile are presented. Dining a group transport, the individual user profiles associated with the users in the group are linked in a collective travelling profile for presentation of selected multimedia contents.

15 Claims, 3 Drawing Sheets

PROCEDURES, SYSTEM AND COMPUTER PROGRAM PRODUCT FOR THE PRESENTATION OF MULTIMEDIA CONTENTS IN ELEVATOR INSTALLATIONS

BACKGROUND OF THE INVENTION

The present invention relates to a procedure, a system and a computer program product for the presentation of multimedia contents in elevator installations.

The U.S. Pat. No. 6,288,688 shows a computer-aided system for the distribution and display of digital advertisement (short messages) within elevator cars. Screens are installed in the elevator cars and such screens are connected with a monitoring unit by means of communication connections. The monitoring unit has a data storage device with digital advertisement. The digital advertisement being individually addressed is dispatched to the screens.

By multimedia is understood the integration of different media into a device. Multimedia contents consist of music compositions, SMS (Short Message service), EMS (Enhanced Messaging service), MMS (Multimedia Messaging service), texts, pictures, videos, movies, but also of scents, lighting effects, etc. Multimedia contents can be presented by means of computers through input and output devices such as screens, loudspeakers, keyboards, microphones, atomizers, lamps, etc.

A task of the present invention is to provide a procedure, a system and a computer program product in order to offer multimedia contents in elevator installations. In particular, individually tailor-made multimedia contents based on the user of the elevator installation are presented.

SUMMARY OF THE INVENTION

The present invention concerns a method for the presentation of multimedia contents in elevator installations comprising the steps of: a) storing for each of a plurality of users of an elevator installation at least one individual user profile with multimedia contents; b) identifying each the users at the elevator installation; c) presenting multimedia contents carried within the individual user profile associated with an identified user of the plurality of users; and d) during a group transport of at least two users of the plurality of users by the elevator installation, linking together the individual user profiles associated with the at least two users in a collective travelling profile.

The present invention also concerns a system for the presentation of multimedia contents in elevator installations comprising: at least one recognition device for recognizing elevator user identification codes; at least one examination device responsive to said at least one recognition device for identifying the recognized identification codes; at least one identification database storing at least one user profile with multimedia contents for each elevator user associated with the identification codes; a computing means being responsive to said user profiles of at least two of said elevator users during a group transport by the elevator installation of said at least two elevator users for linking said user profiles associated with the group transport to a collective travelling profile; and at least one output device connected to said computing means for presenting to the elevator users in the group transport the multimedia contents of the travelling profile.

The present invention further concerns a computer program product for the presentation of multimedia contents in elevator installations comprising: a comparison means for comparing at least one recognized identification code of an elevator user with a plurality of identification addresses; an allocation means responsive to a positive comparison of said comparison means for allocating the at least one recognized identification code to an identical to one of the plurality of identification addresses; an assignment means responsive to an allocation by said allocation means for assigning a user profile with multimedia contents to the identical one of the plurality of identification addresses; and a linking means responsive to said assignment means for linking at least two user profiles to a collective travelling profile when elevator users associated with the at least two user profiles are included in a group transport by the elevator installation.

According to the present invention, at least an individualized user profile with multimedia contents is carried for a user. This user profile is customized; i.e. it contains preferential multimedia contents selected by the user. The user profile contains much information; i.e. the user selects preferential multimedia contents from a large offering. The user profile is far-reaching; i.e. the user receives multimedia contents wherever he is identified.

Preferably, the user is identified before, but could be identified after, entering an elevator car. The identification takes place, preferably, via an identification code. An examination device examines the validity of this recognized identification code. With a valid identification code, the user is considered as identified.

An identified user is presented multimedia contents, which contents are carried in the user profile. Preferably, these multimedia contents are loaded from at least one contents database and offered through at least one output device before, or in the elevator car. Multimedia contents are made available by at least one provider and stored on request in the contents database. Preferably, multimedia contents categorized by demographic travelling preferences, psychographics travelling preferences as well as situational travelling preferences are presented.

By taking into account the fact that 50% of all users in elevator installations proceed in groups, with group transports ensues a group specific preparation of the multimedia contents, which contents are made available in accordance with the individual user profiles. The multimedia contents are adapted one after another for all users of a group transport. For a group transport, individual user profiles are linked to a collective travelling profile. If possible, multimedia contents that are preferred by a majority of the group users, or that are not wished by a minority of the group users, are detected. In this way, only acceptable multimedia contents for all group users are presented.

Furthermore, the user profiles are categorized and anonymously offered to interested commercial entities. Advertisements from such interested commercial entities are associated as multimedia contents to the user profiles, or to the travelling profiles. Such an advertisement is highly successful, since a large number of users are daily transported in elevator installations and since these users are grateful for diversion when proceeding in elevator installations and that only advertisements desired by the users in accordance with the travelling preferences are offered to the users.

The system works well with known and proven means of communication technique and can be added to already installed elevator installations. There are installed at least one recognition device for recognizing an identification code, at least one examination device for identifying a user on the basis of a recognized identification code, at least one contents database for linking at least one user profile with multimedia contents and at least one output device for presenting multimedia contents carried in the user profile.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
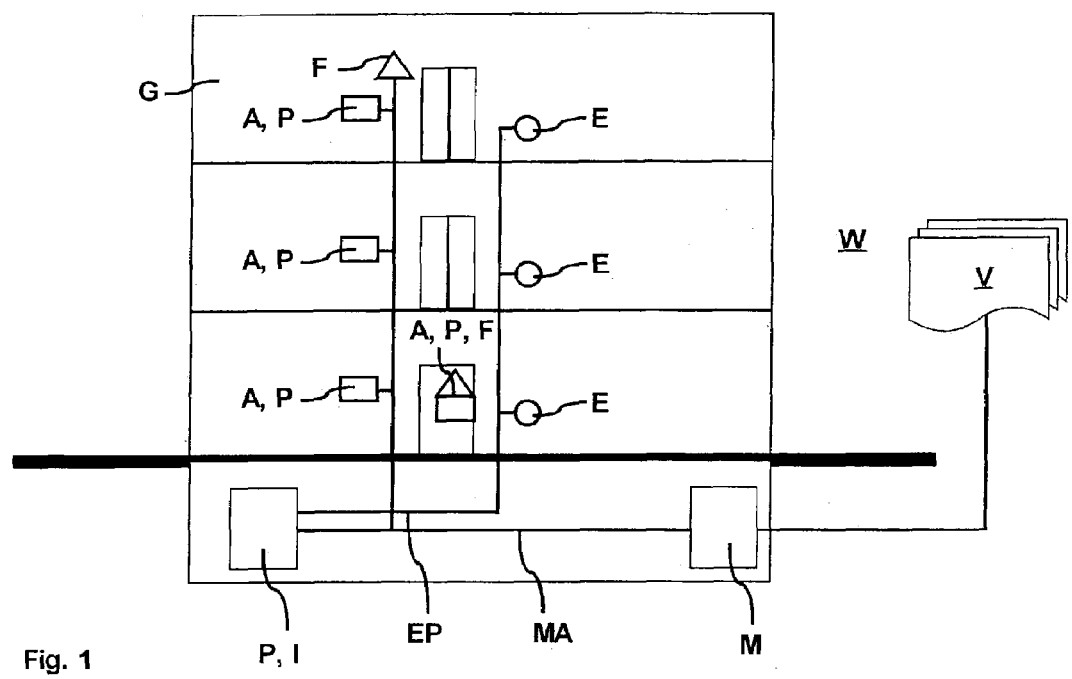
FIG. 1 is a schematic representation of a system according to the present invention for the presentation of multimedia contents in elevator installations.

With respect to the system associated with an elevator installation: FIG. 1 shows schematically an exemplary embodiment form of a system according to the present invention for the presentation of multimedia contents in elevator installations. The system includes at least one recognition device E, at least one examination device P, at least one identification database I, at least one elevator control B, at least one contents database M as well as at least one output device A. The elevator installation is installed in a building G, or a block of buildings, and transports users from a floor to another floor. In accordance with FIG. 1, three floors are represented. The elevator installation is operated for example electrically or hydraulically. Preferably, on each floor there is one of the recognition devices E as well as one of the output devices A installed beside a floor door to the elevator installation. Alternatively, it is also possible to install only one of the recognition devices E, for example on the ground floor of the building G. Preferably, one of the output devices A is installed in an elevator car of the elevator installation. In accordance with FIG. 1, the elevator car is located at the ground floor of the building G, and the output device A of the elevator car is recognized through the open elevator doors. In accordance with FIG. 1, the examination device P, the identification database I and the contents database M are located in a basement of the building G and the elevator control B is located on an upper floor of the building G.

Figure 2:
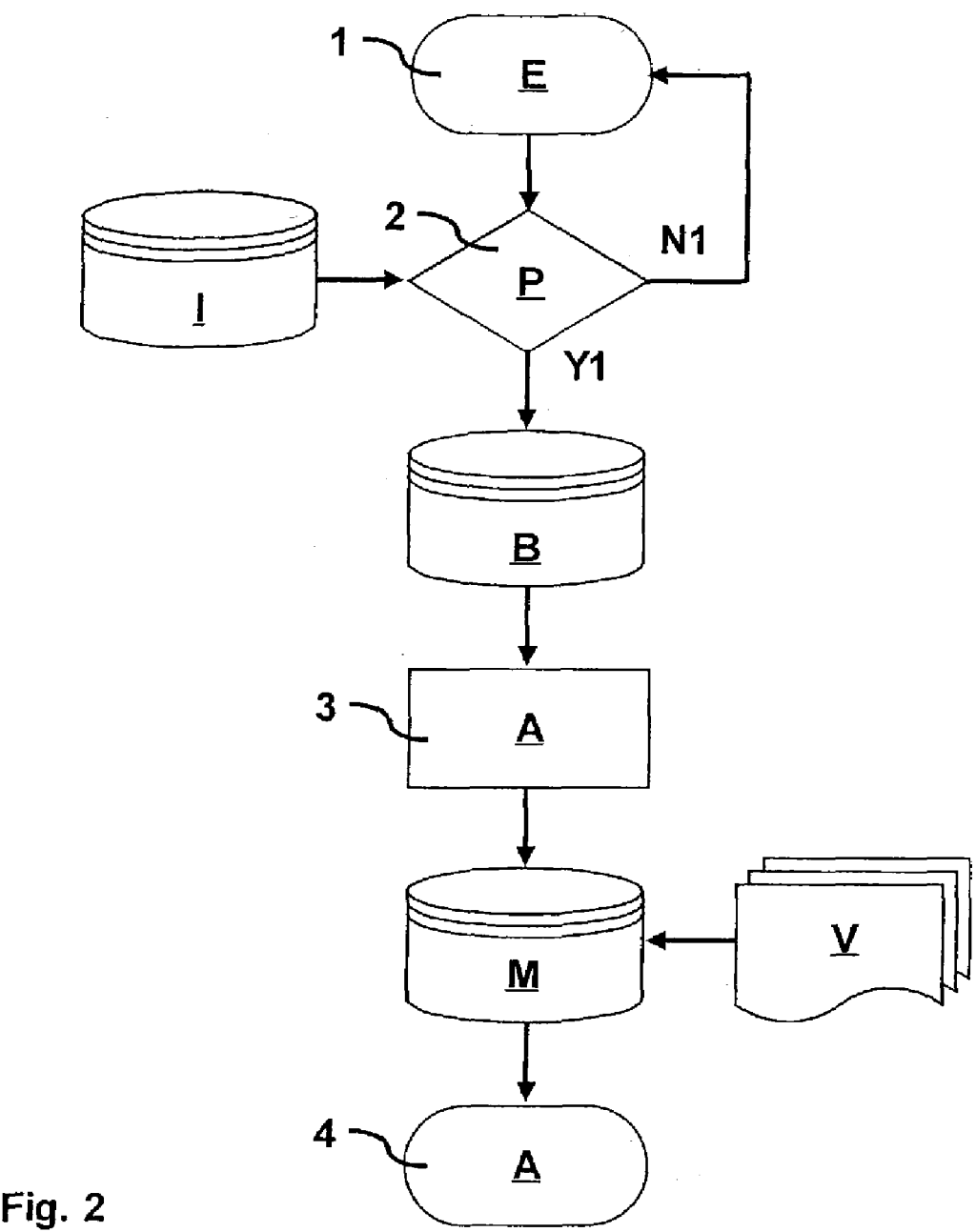
FIG. 2 is a flow diagram of the system of FIG. 1 for the presentation of multimedia contents in elevator installations.

With respect to the identification: FIG. 2 shows an exemplary embodiment of a system for the presentation of multimedia contents. For the presentation of multimedia contents, a user logs onto the system with an identification code. Such a registration 1 takes place, preferably, through the recognition device E for recognizing the identification code. In this connection, several construction forms of the registration 1 can be differentiated:

In a first preferred construction form of the registration 1, the identification code is transmitted by an identification device to the recognition device E. Such contact-less recognition of an identification code is well known from the European patent document EP 699,617. The identification device is here a transponder with a transponder antenna and transmitting electronics. The transmitting electronics of the identification device exhibits a sending unit and a receiving unit and a data storage device with at least one identification code. The identification device is fed by induction through an electromagnetic field with an operating voltage. Preferably, the recognition device E emits such an electromagnetic field. As soon as the identification device is located in the proximity of the recognition device E, it is supplied with energy and it sends the identification code to the recognition device E. For example, the identification device is maintained hereto some centimeters, up to several meters, distance from the recognition device E. The recognition device E receives the identification code through an accordingly developed sending and receiving antenna. Any readable and/or able to be written information devices respectively recognition devices can be realized. So, information devices, which communicate based on light and contactless with a recognition device like a scanner, are likewise applicable. Also applicable are information devices in the form of magnetic cards, electronic chip, etc., which communicate through at least an intermediate contact with a recognition device.

In further construction forms of the registration 1, the identification code is entered by the user mechanically, for example through a keyboard of the recognition device E and/or acoustically, for example through a microphone of the recognition device E. Of course, the man skilled in the art, having knowledge of the present invention, may realize other input devices, respectively output devices such as the output device A with touch-sensitive screen surface, a mobile telephone keyboard, etc.

Finally, it is possible to recognize a biometric identification code of the user, such as a fingerprint, an iris pattern, a face profile, etc. with a recognition device.

With respect to the examination: The recognition device E further transmits the recognized identification code for examination 2 to the examination device P. At least one of the examination devices P is necessary; and several of the examination devices P can be used. The examination device P is computer-aided. Under "computer-aided" is understood a commercially available computing unit such as a PC (Personal Computer) with the operating system Windows, Apple, etc., or respectively a workstation with the operating system UNIX, etc. The identification database I is preferably a relational database such as Access, Lotus Notes, Oracle, SAP, etc. or respectively a XML (Extensible Markup Language) database, etc. The identification database I can be placed into a computer-aided device. The recognition device E, the examination device P and identification database I are equipped with inputs and outputs for communication. Preferably, the communication arises among the recognition device E, the examination device P and identification database I on a recognition bus EP in accordance with a well known standard protocol such as PCI (Peripheral Component Interconnect)—bus, Ethernet, token ring, etc., preferably by radio and/or cable. The examination device P can be developed mobile, or respectively fixed. The examination device P and the identification database I can be integrated, as shown in FIG. 1, into a single housing, but they can also be placed separately in different locations. Of course, it is also possible to realize the recognition device E, the examination device P and the identification database I in a single housing. Furthermore, it is possible to integrate the examination device P and the output devices A, as shown in FIG. 1, into a single housing.

Preferably, a computer program product is installed into the examination device P. The computer program product compares the recognized identification code with identification addresses, which are stored in the identification database I. The user is unequivocally identifiable through an identification address. For each identification address, an identification code exists. For example, an identification address is to be assigned exactly to a recognized identification code, if identification address and identification code are identical. In accordance with FIG. 2, the computer program product supplies then a positive allocation result Y1, if one of the stored identification addresses is identical to the identification code, otherwise the computer program product supplies a negative allocation result N1. Such a negative allocation result is transmitted, for example, to the recognition device E, from which the identification code has been transmitted and the user is called up through the output device A of this recognition device E on a repeated registration 1. By reiterated negative allocation result, a neutral, not individualized guest address can be assigned to the user. The computer program product is written, for example, in a common and proven computer language. For example, the computer program product is stored in a storage unit and is loaded into a processor for the execution of the computer program product.

With respect to the allocation of multimedia contents: Multimedia contents from the contents database M are made available on a call 3 to the user identified accordingly to an identification code. The contents database M is computer-aided. It has inputs and outputs for communication with the examination device P. the output device A and a source of multimedia contents V. Preferably, at least one computer program product is installed in the identification database I and such computer program product assigns to an identification address of the user a user profile with multimedia contents, which multimedia contents are stored into the contents database M. Multimedia contents consist of music compositions, SMS, EMS, MMS, texts, pictures videos, movies, scents, lighting effects, etc. It applies also here that the computer program product can be written in a common and proven computer language. For example, the computer program product is stored in a storage unit and is loaded into a processor for the execution of the computer program product.

With respect to the transmission of multimedia contents: The multimedia contents conforming to an identification address are presented in a presentation 4 on the output device A before or in the elevator car. The contents database M and the output device A communicate, preferably, on a contents bus MA in accordance with a well known standard protocol such as PCI-Bus, Ethernet, token ring, etc., by cables and/or by radio. Of course, it is also possible to transmit multimedia contents by mail, for example stored on a CD (Compact disk).

Figure 3:
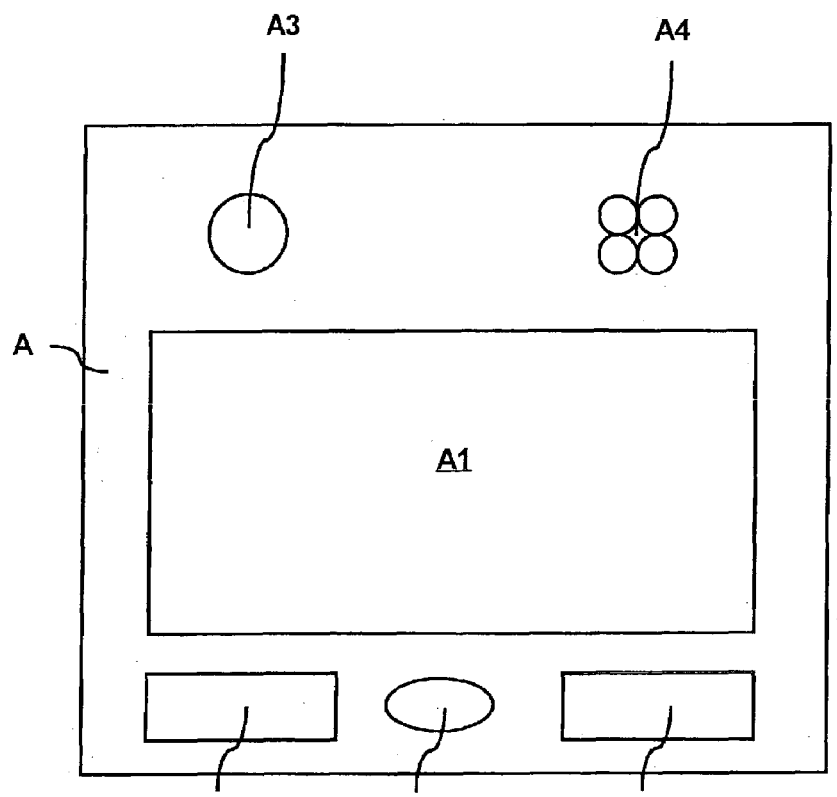
FIG. 3 is a schematic representation of an output device for the system shown in FIGS. 1 and 2.

In accordance with FIG. 1, the output devices A communicate from the floors by cables with the contents database M, while the output device A in the elevator car communicates by radio through a transmitter F and by cables with the contents database M. The output device A is for example, accordingly with FIG. 3, a panel with several areas A1, A2, A3, A4, A5 and A6. For example, it concerns, in the case of the output device A, a computer-aided screen with first, second, third and fourth ranges A1, A2, A3 and A4 respectively for the output of multimedia contents, and with fifth and sixth ranges A5 and A6 respectively for communication with the contents database M. The communication is preferably bi-directional. The output device A receives multimedia contents from the contents database M and displays them in the first area A1 as a graphical representation, in the second area A2 as an acoustical representation, in the third range A3 as an aromatic representation, and in the fourth range A4 as an optical representation. For example, the first area A1 is a screen, the second area A2 is a loudspeaker, the third area A3 is a scent machine and the fourth area A4 is a generator. By scent machine is understood a spray apparatus with a fragrance, or several, freely selectable and mixable fragrances and such spray apparatus sprays this/these fragrance/fragrances. By generator is understood at least a controllable, and/or adjustable lamp and such lamp emits effects lighting.

Preferably, the output device A transmits signals to the contents database M and to the examination device P. For example, the fifth and sixth areas A5 and A6 are touch-sensitive and enable the generation of such signals by the user. With such signals a user can, for example, select and confirm multimedia contents. For confirming multimedia contents the user operates the fifth area A5 and for selecting multimedia contents the user operates the sixth area A6. So long as a user does not actively select multimedia contents, multimedia contents apply as desired. Of course, also other means for the generation of such signals are applicable such as a microphone coupled with speech recognition for receiving language instructions. The man skilled in the art has in this connection, having knowledge of the present invention, multiple possibilities.

Preferably, at least one computer program product is installed in the identification database I, and such computer program product transmits multimedia contents of a user profile as at least one cookie to an output device A. By cookie is understood a file, which exhibits a sequence of multimedia contents, which is presented in a certain order. For example, a cookie consists of a sequence of ten sides, which is presented in a sequence page 1 through page 10. For example, it concerns thereby a sequel history, which is presented to a user by successive transportations in the elevator. The cookie notes the current stage of the sequence, so that after, for example, the presentation of the pages 1 and 2, with a following transport, the page 3 is presented. Preferably, such a cookie can be stored in a data storage unit of the output device A. Preferably, the identification database I transmits the cookie directly to the one of the output devices A, in whose proximity the user is. For this purpose, the output device A receives, for example, a piece of information from the elevator control B that a user identified with an identification code is in its proximity. The output device A announces itself, thereupon, to the identification database I. For example, the output device A transmits the identification address of the identified user to the contents database I. The computer program product assigns a user profile with multimedia contents to this identification address and transmits multimedia contents of this user profile to this output device A. The computer program protect is written, for example, in a common and proven computer language. For example, the computer program product is stored into a storage unit and is loaded into a processor for the execution of the computer program product.

With respect to the structure of multimedia contents: A system architect presents multimedia contents, preferably, in a structure. The structure covers a framework, for example a sequence of pages, respectively columns in pages and in such framework multimedia contents are introduced. In a favorable embodiment form, multimedia contents are structured as Flash film with a software named Flash of the company Macromedia. The software Flash permits the simple and rapid provision of appealing designs, unusual animations, which are provided with music. Other software such as HTML (Hypertext Markup LANGUAGE) can, of course, also be used.

Multimedia contents are categorized. The system architect offers a multiplicity of categorized multimedia contents to the user in his user profile. Such categories are subdivided, preferably, into travelling preferences such as demographic travelling preferences, psychographics travelling preferences, as well as situational travelling preferences.

Demographic travelling preferences are for example:

The language presentation (for example: DE, GB, FR, IT, etc.)

The sex of the user (male/female)

The age of the user (for example: subdivided into age groups of 0-13, 14-20, 21-30, 31-40, 41-50, 51-65, 66-80, 81-120 years)

Civil status (for example: single, married, divorced, widowed)

Income (for example: subdivided into income classes of 0-30,000, 30,001-60,000, 60,001-90,000, 90,001-120,000, 120,001-180,000,>180,000 CHF/per year)

Psychographics travelling preferences are for example:

Information preferences (for example: weather forecast, horoscope, stock exchange briefing, sport news, topicalities, local news, etc.)

Culture preferences (for example: Italian meal, Chinese meal, wine, cigars, etc.)

Music preferences (for example: pop-music, classical music, jazz music, etc.)

Scent preferences (for example: lavender, peppermint, eucalyptus, etc.)

Light preferences (for example violent lightning, mat warm light, etc.)

Situational travelling preferences are for example:

Zone preferences (for example: pre-determined zones, floors of a building G)

Period preferences (for example: pre-determined periods (in the morning, in the afternoon, at night), clock times (coffee break, lunch break), etc.)

Preferably, a computer program product is provided, which categorises multimedia contents for a user profile. The computer program product is written, for example, in a common and proven computer language. For example, the computer program product is stored in a storage unit and is loaded into a processor for the execution of the computer program product. Each category has at least one specific multimedia content. Preferably, each category exhibits several specific multimedia contents. For example, the category "information preferences" exhibits specific multimedia contents such as "weather forecast, horoscope, stock exchange briefing, sport news, topicalities, local news, etc.". The different categories are linkable one to each other, in accordance with at least a logical element such as "AND", "OR", "NOT". For example, a psychographics travelling preference can be modulated through a situational travelling preference, for example, by adapting the "information preferences" with the "period preferences", in such a manner that, in the morning the weather forecast, at noon the stock exchange briefing and in the evening the topicalities are presented. Multimedia contents are thus scalable, i.e. in the three-dimensional space, which is extended through the dimensions of degree of customization, richness of content and range, and a structure with specific multimedia contents is made available for the user and such multimedia contents constitute for the user a valuable, optimal content.

With regard to the procurement of multimedia contents: Multimedia contents V are obtained, preferably, by a provider W (FIG. 1). Preferably, the contents database M communicates with the provider W by means of communication tools such as the Internet and over established standard protocols such as TCP/IP (Transmission Control Protocol/Internet Protocol), FTP (File Transfer Protocol), etc. The contents database M works, preferably, with a software based upon the Open Services Gateway initiative (OSGi) specification. OSGi has set a much-considered open standard, whereby the update, respectively upgrade possibilities of the multimedia contents V by the provider W enable topicality and a high level of customization. The multimedia contents V are provided, preferably with a purchase order form, by the provider W. Preferably, a computer program product is provided that lists the multimedia contents to be updated and that for the entire contents database M and per actualization interval of the provider W. The computer program product is written, for example, in a common and proven computer language. For example, the computer program product is stored in a storage unit and is loaded into a processor for the execution of the computer program product. The actualization intervals can vary depending upon category, for example the horoscope is updated every 24 hours, the weather forecast is updated every 12 hours, while the stock exchange briefing is updated every 2 minutes. Representative actualization intervals are every 24 hours, and/or every 8 hours, and/or every 2 hours, and/or every 60 minutes, and/or every 15 minutes, and/or every 2 minutes, and/or every 60 seconds, and/or every 15 seconds.

Figure 4:
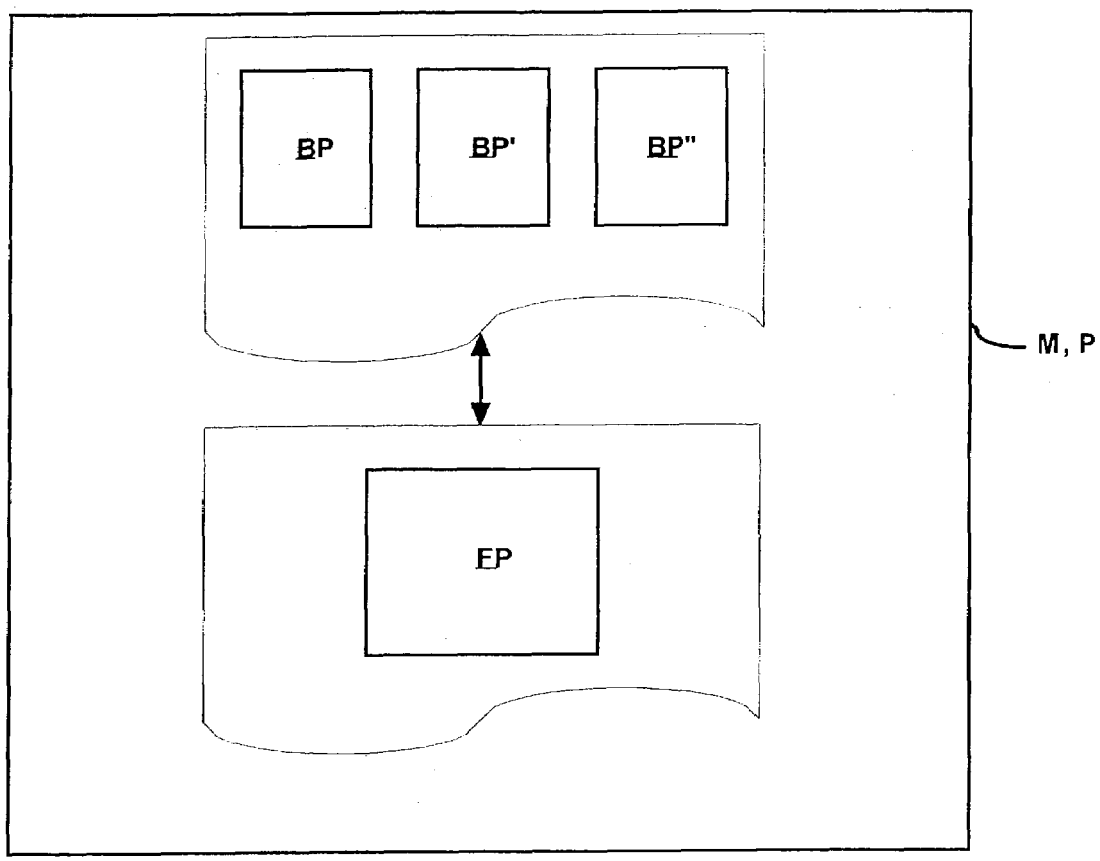
FIG. 4 is a schematic representation of a group specific adjustment of multimedia contents for the system shown in FIG. 1.

With regard to the group specific adjustment of multimedia contents: Based on the fact that 50% of all users in elevator installations proceed in groups, with group transports ensues a group specific preparation of the multimedia contents, which is made available in accordance with the individual user profiles. As an example represented in accordance with FIG. 4, hereto individual user profiles BP, BP' and BP" are linked to at least one travelling profile FP. This adjustment of multimedia contents arises, preferably, by means of the contents database M via the examination device P, or via any computing unit. For each recognized identification code, at least one of the user profiles BP, BP' and BP" from the contents data base M is made available, and with a processor links to the travelling profile FP, preferably in accordance with at least one logical element such as "AND", "OR", "NOT", etc. Preferably, the computer program product forms, thereby for each category of travelling preferences, a mathematical result like a sum, a product, an average, etc. If possible, such multimedia contents, which are preferred by a majority of the group users, or which are not wished by a minority by group users, are detected. The transportation of the users, in accordance with such a travelling profile FP, is for the users to be carried more pleasant, since unwanted travelling preferences, which are not wished to be received from any of the users to be carried, are purposefully avoided. In this way, only acceptable multimedia contents for all group users are presented.

The allocation and linkage of the user profiles BP, BP' and BP" is carried out by at least one computer program product. The computer program product is written, for example, in a common and proven computer language. For example, the computer program product is stored in a storage unit and is loaded into a processor for the execution of the computer program product. The computer program product is storable in well-known way, reproducible and able to be updated. The man skilled in the art, by having knowledge of the present invention, can of course realize any variations of this embodiment form of a computer program product. Like that, it is not necessary for the purposes of the invention that the computer program product is implemented in the contents database M, or in the examination device P. It is quite possible to implement the computer program product into any separate computing unit provided for the execution of the computer program product and to transmit the result of the execution of the computer program product to the contents database M, or to the examination device P. For example, the computer program product is implemented in a remote server. Hereto, the system for example can be connected by a wire, or a radio line, or via Internet, with such a computing unit.

In the following, the function mode of the group specific preparation of multimedia contents is explained via an example:

For example, a user profile denotes an aversion against the specific multimedia contents "Jazz music". The computer program product sets this firmly, for example through an operation "NOT" "Jazz music" and does not offer "Jazz music" to the group to be transported.

With regard to the placement of advertisement in accordance with user profiles: Daily, many hundred million users are transported in elevator installations. Results of investigations show that the users are with the transporting in the elevator installations highly concentrated and open and grateful for diversion such as advertisements. For these reasons, the user profiles categorized based on the travelling preferences can be used for advertising purposes. For data security reasons, these user profiles are anonymously offered to interested commercial circles. The interested commercial circles convey advertisements. These advertisements are linked to the user profiles, respectively the travelling profiles as multimedia contents. Such an advertisement is highly successful, since only advertisement desired from the users in accordance with their travelling preferences is offered to them.

The linking of the advertisement in the multimedia contents arises, preferably, by means of the contents database M. Hereto, a computer program product is provided. The computer program product is written, for example, in a common and proven computer language. For example, the computer program product is stored in a storage unit and is loaded into a processor for the execution of the computer program product. Preferably, a user profile, respectively a travelling profile is connected to an advertisement with a processor, in accordance with at least one logical element such as "AND", "OR", "NOT", etc. Preferably, the computer program product forms thereby for each category of travelling preferences a mathematical result like a sum, a product, an average, etc. In particular, the travelling preferences of the users are determined in quality and quantity and advertisement is associated purposefully to these travelling preferences. By purposeful association of travelling preferences is understood a connection of travelling preferences, which provide an advantage to all participants. The buyer of travelling preferences receives a warranty that his advertisement encounters interest with the users; the salesman of the travelling preferences generates an increase in value and the users receive the desired advertisement in accordance with their travelling preferences.

In the following, the function mode of placement of advertisement in multimedia contents is described via an example:

For example, the user profiles of a group show a preference for the specific multimedia content "Italian meal". An Italian restaurant, as interested commercial entity, has transmitted its "menu of today" as an advertisement to the contents database. The computer program product connects this advertisement to the specific multimedia contents, for example, through an operation "Italian meal" "AND" "menu of today" and offers this advertisement as multimedia contents to the group being transported at midday. The elevator users in this way become aware of the services of the Italian restaurant and can contact the Italian restaurant through the output device A and, for example, book a table.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for the presentation of multimedia contents in elevator installations comprising the steps of:
   a. pre-setting and storing for each of a plurality of users of an elevator installation in the elevator installation at least one individual user profile with multimedia contents, each said individual profile being associated with only one of said users;
   b. identifying each of the users at the elevator installation;
   c. presenting through the elevator installation multimedia contents carried within the pre-set individual user profile associated with an identified user of the plurality of users; and
   d. during a group transport of at least two users of the plurality of users by the elevator installation, linking together the pre-set individual user profiles associated with the at least two users in a collective travelling profile.

2. The method according to claim 1 including categorizing the multimedia contents of the individual user profiles.

3. The method according to claim 2 including categorizing the multimedia contents in accordance with at least one of a demographic travelling preference, a psychographics travelling preference, and a situational travelling preference.

4. The method according to claim 3 wherein said step d is performed by linking the categorized multimedia contents, in accordance with the desired travelling preferences of the users, and presenting preferred ones of all of the multimedia contents to the at least two users.

5. The method according to claim 3 wherein said step d is performed by linking the categorized multimedia contents, in accordance with the desired travelling preferences of the users, and not presenting unwanted ones of all of the multimedia contents to the at least two users.

6. The method according to claim 1 including forming anonymous user profiles from the individual user profiles and offering the anonymous user profiles to interested commercial entities.

7. The method according to claim 1 including linking at least one advertisement to the multimedia contents.

8. A system for the presentation of multimedia contents in elevator installations comprising:
   at least one recognition device for recognizing elevator user identification codes;
   at least one examination device responsive to said at least one recognition device for identifying the recognized identification codes;
   at least one identification database storing at least one user profile with multimedia contents for each elevator user associated with the identification codes, forming a pre-set user profile individual to each of said elevator users;
   a computing means being responsive to said pre-set user profiles of at least two of said elevator users during a group transport by the elevator installation of said at least two elevator users for linking said pre-set user profiles associated with the group transport to a collective travelling profile; and at least one output device connected to said computing means for presenting to the elevator users in the group transport the multimedia contents based on the travelling profile.

9. The system according to claim 8 wherein the multimedia contents of the user profiles are categorized by desired travelling preferences of the users and said at least one output device presents preferred ones of all of the multimedia contents to the users in the group transport.

10. The system according to claim 8 wherein the multimedia contents of the user profiles are categorized by desired travelling preferences of the users and said at least one output device does not present unwanted ones of all of the multimedia contents to the users in the group transport.

11. The system according to claim 8 wherein said computing means forms anonymous user profiles from the individual user profiles for offering to interested commercial entities.

12. The system according to claim 8 wherein said computing means links at least one advertisement to the multimedia contents of the travelling profile.

13. A computer program product for the presentation of multimedia contents in elevator installations comprising:

a comparison means in an elevator installation for comparing at least one recognized identification code of an elevator user with a plurality of identification addresses;

an allocation means in the elevator installation responsive to a positive comparison of said comparison means for allocating the at least one recognized identification code to an identical to one of the plurality of identification addresses;

an assignment means in the elevator installation responsive to an allocation by said allocation means for assigning a user profile with multimedia contents to the identical one of the plurality of identification addresses, wherein said user profile is established and pre-set for each individual user within said elevator installation; and a linking means in the elevator installation responsive to said assignment means for linking at least two of said user profiles to a collective travelling profile when elevator users associated with the at least two of said user profiles are included in a group transport by the elevator installation.

14. The computer program product according to claim 13 including a categorizing means for categorizing the multimedia contents within each of the at least two user profiles in accordance with at least one travelling preference of the associated elevator user.

15. The computer program product according to claim 13 wherein said linking means links the at least two user profiles to the travelling profile in accordance with a logical element.

* * * * *